US010333170B2

(12) United States Patent
Kato

(10) Patent No.: US 10,333,170 B2
(45) Date of Patent: Jun. 25, 2019

(54) SULFIDE SOLID ELECTROLYTE MATERIAL, BATTERY, AND METHOD FOR PRODUCING SULFIDE SOLID ELECTROLYTE MATERIAL

(71) Applicant: TOYOTA JIDOSHA KABUSHIKI KAISHA, Toyota-shi, Aichi-ken (JP)

(72) Inventor: Yuki Kato, Gotemba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 287 days.

(21) Appl. No.: 15/010,582

(22) Filed: Jan. 29, 2016

(65) Prior Publication Data

US 2016/0248119 A1 Aug. 25, 2016

(30) Foreign Application Priority Data

Feb. 25, 2015 (JP) ................................ 2015-035418

(51) Int. Cl.
*H01M 10/052* (2010.01)
*H01B 1/10* (2006.01)
*H01M 10/0562* (2010.01)

(52) U.S. Cl.
CPC .......... *H01M 10/0562* (2013.01); *H01B 1/10* (2013.01); *H01M 10/052* (2013.01); *H01M 2300/0068* (2013.01)

(58) Field of Classification Search
None
See application file for complete search history.

(56) References Cited

U.S. PATENT DOCUMENTS

2013/0040208 A1 2/2013 Kanno et al.
2015/0333368 A1 11/2015 Kato et al.
2016/0164136 A1 6/2016 Higuchi et al.

FOREIGN PATENT DOCUMENTS

JP 2013041749 A * 2/2013
JP 2013-137889 A 7/2013
JP 2015032550 A * 2/2015
(Continued)

OTHER PUBLICATIONS

Whiteley, J. M. et al. "Empowering the Lithium Metal Battery Through A Silicon-Based Superionic Conductor". Journal of the Electrochemical Society, vol. 161, No. 12, 2014, pp. A1812-A1817. The Electrochemical Society, doi:10.1149/2.0501412jes. (Year: 2014).*

*Primary Examiner* — Robert S Carrico
(74) *Attorney, Agent, or Firm* — Oliff PLC

(57) ABSTRACT

An object of the present invention is to provide a sulfide solid electrolyte material with favorable ion conductivity. In the present invention, the above object is achieved by providing a sulfide solid electrolyte material comprising a composition of $Li_xSi_yP_zS_{1-x-y-z-w}X_w$ ($0.37\leq x\leq 0.40$, $0.054\leq y\leq 0.078$, $0.05\leq z\leq 0.07$, $0\leq w\leq 0.05$, and X is at least one of F, Cl, Br, and I), characterized in that the sulfide solid electrolyte material has a crystal phase A having a peak at a position of $2\theta=29.58°\pm1.00°$ in X-ray diffraction measurement using a CuKα ray, the sulfide solid electrolyte material does not have a crystal phase B having a peak at a position of $2\theta=30.12°\pm1.00°$ in X-ray diffraction measurement using a CuKα ray, or slightly has the crystal phase B.

6 Claims, 5 Drawing Sheets

(56) References Cited

FOREIGN PATENT DOCUMENTS

| | | | |
|---|---|---|---|
| JP | 2015-220013 | A | 12/2015 |
| WO | 2011/118801 | A1 | 9/2011 |
| WO | 2015/001818 | A1 | 1/2015 |

* cited by examiner

SULFIDE SOLID ELECTROLYTE MATERIAL, BATTERY, AND METHOD FOR PRODUCING SULFIDE SOLID ELECTROLYTE MATERIAL

TECHNICAL FIELD

The present invention relates to a sulfide solid electrolyte material with favorable ion conductivity.

BACKGROUND ART

In recent years, with rapid spread of information-related equipment and communication equipment such as personal computers, video cameras, and mobile phones, the development of batteries used as a power source therefor has been emphasized. Further, also in the automobile industry and other industries, the development of batteries having high output and high capacity for electric vehicles or hybrid vehicles has been advanced. Among various batteries, a lithium battery has been presently noticed from the viewpoint of a high energy density.

A liquid electrolyte containing a flammable organic solvent is used for a presently commercialized lithium battery, so that the installation of a safety device for restraining temperature rise during a short circuit and an apparatus for preventing a short circuit are necessary therefor. To the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

A sulfide solid electrolyte material has been known as a solid electrolyte material used for an all solid lithium battery. For example, Patent Literature 1 discloses a LiSiPS-based sulfide solid electrolyte material (argyrodite type). Further, for example, Patent Literature 2 discloses a sulfide solid electrolyte material having a composition of $Li_{(4-x)}Ge_{(1-x)}P_xS_4$.

CITATION LIST

Patent Literature

Patent Literature 1: Japanese Patent Application Publication (JP-A) No. 2013-137889

Patent Literature 2: WO 2011/118801

SUMMARY OF INVENTION

Technical Problem

A solid electrolyte material with favorable ion conductivity has been demanded from the viewpoint of achieving higher output of a battery. The present invention has been made in view of the above-described problems, and a main object thereof is to provide a sulfide solid electrolyte material with favorable ion conductivity.

Solution to Problem

In order to solve the above-described problems, the present invention provides a sulfide solid electrolyte material comprising a composition of $Li_xSi_yP_zS_{1-x-y-z-w}X_w$ ($0.37 \leq x \leq 0.40$, $0.054 \leq y \leq 0.078$, $0.05 \leq z \leq 0.07$, $0 \leq w \leq 0.05$, and X is at least one of F, Cl, Br, and I), characterized in that the sulfide solid electrolyte material has a crystal phase A having a peak at a position of $2\theta=29.58° \pm 1.00°$ in X-ray diffraction measurement using a CuKα ray, the sulfide solid electrolyte material does not have a crystal phase B having a peak at a position of $2\theta=30.12° \pm 1.00°$ in X-ray diffraction measurement using a CuKα ray, or in a case where the sulfide solid electrolyte material has the crystal phase B, when a diffraction intensity at the peak of $2\theta=29.58° \pm 1.00°$ is designated as $I_A$ and a diffraction intensity at the peak of $2\theta=30.12° \pm 1.00°$ is designated as $I_B$, a value of $I_B/I_A$ is 0.6 or less.

According to the present invention, since the sulfide solid electrolyte material comprises a specific composition, has the crystal phase A, and does not have the crystal phase B, or if the sulfide solid electrolyte material has the crystal phase B, the crystal phase B is slightly contained, it is possible to obtain the sulfide solid electrolyte material with favorable ion conductivity.

In the above-described invention, it is preferable that the "w" satisfies $0 < w \leq 0.05$.

Further, in the present invention, there is provided a battery comprising: a cathode active material layer containing a cathode active material; an anode active material layer containing an anode active material; and an electrolyte layer formed between the cathode active material layer and the anode active material layer, in which at least one of the cathode active material layer, the anode active material layer, and the electrolyte layer contains the sulfide solid electrolyte material described above.

According to the present invention, when the above-described sulfide solid electrolyte material is used, it is possible to obtain a high-output battery.

Further, in the present invention, there is provided a method for producing a sulfide solid electrolyte material, the sulfide solid electrolyte material being the sulfide solid electrolyte material described above, the method comprising steps of: an ion conductive material synthesizing step of synthesizing an amorphized ion conductive material by mechanical milling while using a raw material composition containing the constitutional component of the sulfide solid electrolyte material; and a heating step of heating the amorphized ion conductive material to obtain the sulfide solid electrolyte material.

According to the present invention, a sulfide solid electrolyte material with favorable ion conductivity can be obtained by performing amorphization in the ion conductive material synthesizing step and then performing the heating step.

Advantageous Effects of Invention

The sulfide solid electrolyte material of the present invention exhibits an effect of having favorable ion conductivity.

DESCRIPTION OF EMBODIMENTS

Hereinafter, a sulfide solid electrolyte material, a battery, and a method for producing a sulfide solid electrolyte material of the present invention will be described in detail.

A. Sulfide Solid Electrolyte Material

First, the sulfide solid electrolyte material of the present invention will be described. The sulfide solid electrolyte material of the present invention comprises a composition of $Li_xSi_yP_zS_{1-x-y-z-w}X_w$ ($0.37 \leq x \leq 0.40$, $0.054 \leq y \leq 0.078$, $0.05 \leq z \leq 0.07$, $0 \leq w \leq 0.05$, and X is at least one of F, Cl, Br, and I), in which the sulfide solid electrolyte material has a crystal phase A having a peak at a position of $2\theta=29.58\pm1.00°$ in X-ray diffraction measurement using a CuKα ray, the sulfide solid electrolyte material does not have a crystal phase B having a peak at a position of $2\theta=30.12°\pm1.00°$ in X-ray diffraction measurement using a CuKα ray, or in a case where the sulfide solid electrolyte material has the crystal phase B, when a diffraction intensity at the peak of $2\theta=29.58°\pm1.00°$ is designated as $I_A$ and a diffraction intensity at the peak of $2\theta=30.12°\pm1.00°$ is designated as $T_B$, a value of $I_B/I_A$ is 0.6 or less.

Figure 1:
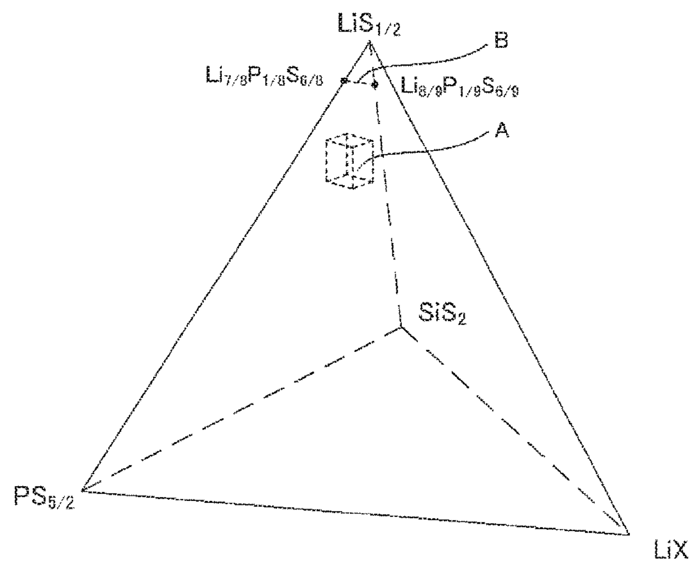
FIG. 1 is a four-dimensional diagram illustrating a compositional range of a sulfide solid electrolyte material of the present invention.

According to the present invention, since the sulfide solid electrolyte material comprises a specific composition, has the crystal phase A, and does not have the crystal phase B, or if the sulfide solid electrolyte material has the crystal phase B, the crystal phase B is slightly contained, it is possible to obtain the sulfide solid electrolyte material with favorable ion conductivity. Further, the ion conductivity is greatly influenced by a valence of an element forming the skeleton of the crystal phase and an ionic radius. In the composition in the present invention, since a skeleton suitable for Li ion conduction is formed and the Li ion is less likely to be confined in the skeleton, it is considered that high ion conductivity is exerted. Further, the sulfide solid electrolyte material of the present invention is a novel material which has not conventionally been known. Incidentally, the compositional range of the sulfide solid electrolyte material of the present invention corresponds to a region A in FIG. 1. On the other hand, Patent Literature 1 discloses a LiSiPS-based sulfide solid electrolyte material and the compositional range thereof corresponds to a region B in FIG. 1. In this way, the compositional range in the present invention is completely different from the compositional range in Patent Literature 1.

The sulfide solid electrolyte material of the present invention comprises a composition of $Li_xSi_yP_zS_{1-x-y-z-w}X_w$ ($0.37 \leq x \leq 0.40$, $0.054 \leq y \leq 0.078$, $0.05 \leq z \leq 0.07$, $0 \leq w \leq 0.05$, and X is at least one of F, Cl, Br, and I). Incidentally, "x", "y", "z", and "w" can be identified by ICP.

"$0.37 \leq x$" in the above-described composition technically means $0.365 \leq x$. That is, a value of "x" in the above determination means a value rounded at one lower place of a significant figure (in this case, at the third decimal place). In this regard, the same is applied to "y", "z", and "w". "x" way satisfy $0.38 \leq x$. Further, similar to the above description, "$x \leq 0.40$" technically means $x \leq 0.404$. "x" may satisfy $x \leq 0.39$.

"y" generally satisfies $0.054 \leq y$, and may satisfy $0.056 \leq y$ or $0.058 \leq y$. On the other hand, "y" generally satisfies $y \leq 0.078$ and may satisfy $y \leq 0.076$. Further, "z" generally satisfies $0.05 \leq z$ and may satisfy $0.055 \leq z$. On the other hand, "z" generally satisfies $z \leq 0.07$ and may satisfy $z \leq 0.065$. Further, "w" generally satisfies $0 \leq w$, and may satisfy $0<w$, $0.01 \leq w$, or $0.02 \leq w$. In the case of $0<w$, a part of sulfur (S) is substituted with halogen (X) and thus an influence of the interaction between sulfur and lithium can be reduced. Therefore, there is a possibility that Li ion conductivity is improved. On the other hand, "w" generally satisfies $w \leq 0.05$ and may satisfy $w \leq 0.04$.

X in the above-described composition is generally at least one of F, Cl, Br, and I, above all, at least one of Cl and Br is preferable.

The sulfide solid electrolyte material of the present invention has a crystal phase A having a peak at a position of $2\theta=29.58°\pm1.00°$ in X-ray diffraction measurement using a CuKα ray. The crystal phase A is the same crystal phase of the LiGePS-based sulfide solid electrolyte material described in Patent Literature 2 and has high ion conductivity. The crystal phase A generally has peaks at positions of $2\theta=17.38°$, 20.18°, 20.44°, 23.56°, 23.96°, 24.93°, 26.96°, 29.07°, 29.58°, 31.71°, 32.66°, and 33.39°. Incidentally, regarding these peak positions, a crystal lattice slightly changes due to factors such as the material composition, and these peak positions occasionally shift in the range of ±1.00°. Above all, each peak position is preferably in the range of ±0.50°.

Figure 2:
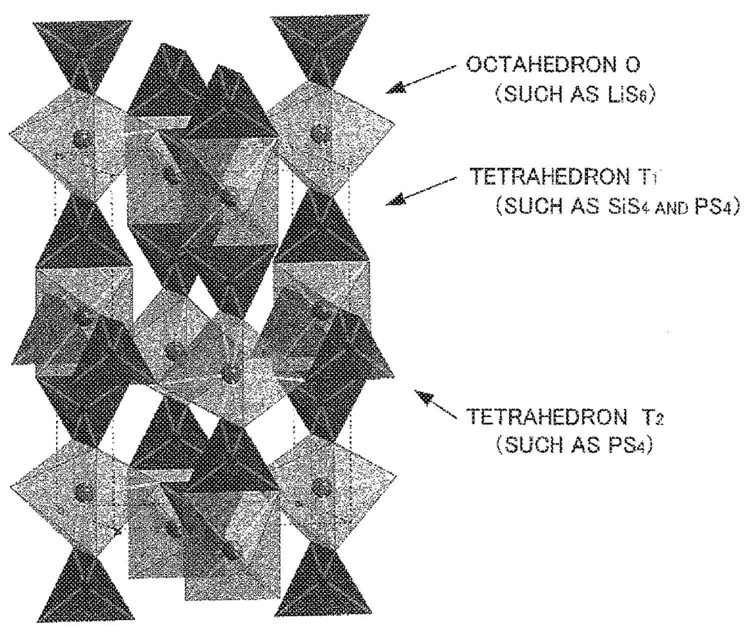
FIG. 2 is a perspective view describing an example of the crystalline structure of a crystal phase A of the present invention.

FIG. 2 is a perspective view describing an example of the crystalline structure of the crystal phase A. The crystal phase A has an octahedron O composed of a Li element and a S element, a tetrahedron $T_1$ composed of an $M_a$ element and a S element, and a tetrahedron $T_2$ composed of an $M_b$ element and a S element. The tetrahedron $T_1$ and the octahedron O share an edge, and the tetrahedron $T_2$ and the octahedron O have a crystalline structure sharing a corner. The $M_a$ element and the $M_b$ element each are at least one of a Si element and a P element. Further, there is a possibility that the S of the octahedron O and the tetrahedra $T_1$ and $T_2$ is substituted with halogen X.

The ratio of the crystal phase A contained in the sulfide solid electrolyte material of the present invention relative to the total crystal phase is preferably larger. Specifically, the ratio of the crystal phase A is preferably 50 wt % or more, more preferably 70 wt % or more, and further preferably 90 wt % or more. Incidentally, the ratio of the crystal phase can be measured by synchrotron radiation XRD, for example.

The sulfide solid electrolyte material of the present invention does not have a crystal phase B having a peak at a position of $2\theta=30.12°\pm1.00°$ in X-ray diffraction measurement using a CuKα ray, or slightly has the crystal phase B. The crystal phase B is considered to be a crystal phase of argyrodite type. The crystal phase B generally has peaks at positions of $2\theta=15.60°$, 18.04°, 25.60°, 30.12°, 31.46°, 45.26°, 48.16°, and 52.66°. Incidentally, regarding these peak positions, a crystal lattice slightly changes due to factors such as the material composition, and these peak positions occasionally shift in the range of ±1.00°. Above all, each peak position is preferably in the range of ±0.50°.

The ratios of the crystal phase A and the crystal phase B are not particularly limited. When a diffraction intensity at the peak of the crystal phase A (the peak in the vicinity of 2θ=29.58°) is designated as $I_A$ and a diffraction intensity at the peak of the crystal phase B (the peak in the vicinity of 2θ=30.12°) is designated as $I_B$, a value of $I_B/I_A$ is preferably smaller. The value of $I_B/I_A$ is generally 0.6 or less, preferably 0.4 or less, more preferably 0.2 or less, and further preferably 0.1 or less.

Further, as described in Patent Literature 2, there is a possibility that a crystal phase having lower ion conductivity than the crystal phase A is precipitated when the crystal phase A is precipitated. When this crystal phase is considered as a crystal phase C, the crystal phase C generally has peaks of 2θ=17.46°, 18.12°, 19.99°, 22.73°, 25.72°, 27.33°, 29.16°, and 29.78°. Incidentally, also these peak positions occasionally shift in the range of ±1.00°. Here, when a diffraction intensity at the peak of the crystal phase A (the peak in the vicinity of 2θ=29.58°) is designated as $I_A$ and a diffraction intensity at the peak of the crystal phase C (the peak in the vicinity of 2θ=27.33°) is designated as $I_C$, a value of $I_C/I_A$ is, for example, less than 0.50, preferably 0.45 or less, more preferably 0.25 or less, further preferably 0.15 or less, and particularly preferably 0.07 or less. In addition, the value of $I_C/I_A$ is preferably 0. In other words, the sulfide solid electrolyte material of the present invention preferably does not have the crystal phase C.

The sulfide solid electrolyte material of the present invention is generally a crystalline sulfide solid electrolyte material. Further, the sulfide solid electrolyte material of the present invention is preferably high in ion conductivity, and ion conductivity of the sulfide solid electrolyte material at 25° C. is, for example, $2.1\times10^{-3}$ S/cm or more, preferably $3.4\times10^{-3}$ S/cm or more, and more preferably $4.0\times10^{-3}$ S/cm or more. In addition, the shape of the sulfide solid electrolyte material of the present invention is not particularly limited but examples thereof may include a powdery shape. Further, the average particle diameter ($D_{50}$) of the powdery sulfide solid electrolyte material is, for example, preferably in the range of 0.1 μm to 50 μm.

The sulfide solid electrolyte material of the present invention has high ion conductivity and thus can be used for an arbitrary use in which ion conductivity is required. Above all, the sulfide solid electrolyte material of the present invention is preferably used for a battery. The reason for this is that the sulfide solid electrolyte material of the present invention can greatly contribute to achieving higher output of a battery. Further, a method for producing a sulfide solid electrolyte material of the present invention will be described in detail in "C. Method for Producing Sulfide Solid Electrolyte Material" which will be described later.

B. Battery

Figure 3:
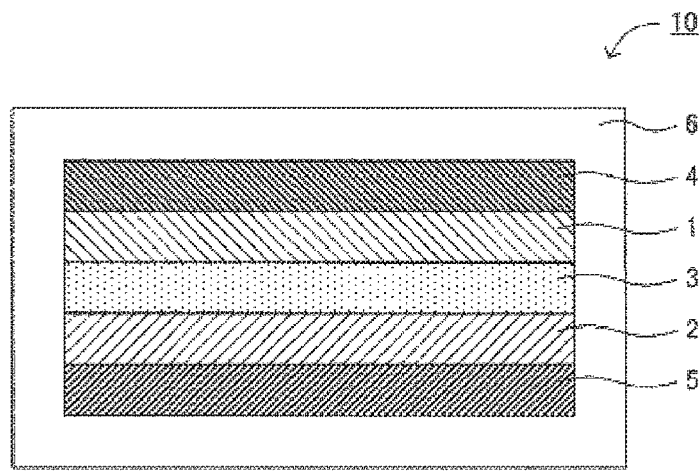
FIG. 3 is a schematic cross-sectional view illustrating an example of a battery of the present invention.

Next, the battery of the present invention will be described. FIG. 3 is a schematic cross-sectional view illustrating an example of a battery of the present invention. A battery 10 in FIG. 3 comprises a cathode active material layer 1 containing a cathode active material, an anode active material layer 2 containing an anode active material, an electrolyte layer 3 formed between the cathode active material layer 1 and the anode active material layer 2, a cathode current collector 4 for collecting current by the cathode active material layer 1, an anode current collector 5 for collecting current by the anode active material layer 2, and a battery case 6 for accommodating these members. The present invention has a great feature in that at least one of the cathode active material layer 1, the anode active material layer 2, and the electrolyte layer 3 contains the sulfide solid electrolyte material described in the above-described "A. Sulfide Solid Electrolyte Material."

According to the present invention, when the above-described sulfide solid electrolyte material is used, it is possible to obtain a high-output battery.

Hereinafter, each constitution of the battery of the present invention will be described.

1. Cathode Active Material Layer

The cathode active material layer in the present invention is a layer which contains at least a cathode active material. The cathode active material layer may contain at least one of a solid electrolyte material, a conductive material, and a binder, as necessary. In particular, in the present invention, the cathode active material layer contains a solid electrolyte material and the solid electrolyte material is preferably the above-described sulfide solid electrolyte material. The ratio of the sulfide solid electrolyte material contained in the cathode active material layer varies depending on the type of the battery. However, the ratio of the sulfide solid electrolyte material is, for example, in the range of 0.1% by volume to 80% by volume, above all, preferably in the range of 1% by volume to 60% by volume and particularly preferably in the range of 10% by volume to 50% by volume. Further, examples of the cathode active material may include $LiCoO_2$, $LiMnO_2$, $Li_2NiMn_3O_8$, $LiVO_2$, $LiCrO_2$, $TIFePO_4$, $LiCoPO_4$, $LiNiO_2$, and $LiNi_{1/3}Co_{1/3}Mn_{1/3}O_2$.

The cathode active material layer may further contain a conductive material. When the conductive material is added, the conductivity of the cathode active material layer can be improved. Examples of the conductive material may include acetylene black, ketjen black, and carbon fiber. Further, the cathode active material layer may contain a binder. As the type of the binder, for example, a fluoride-containing binder such as polyvinylidene fluoride (PVDF) can be exemplified. Further, the thickness of the cathode active material layer is, for example, preferably in the range of 0.1 μm to 1000 μm.

2. Anode Active Material Layer

The anode active material layer in the present invention is a layer which contains at least an anode active material. The anode active material layer may contain at least one of a solid electrolyte material, a conductive material, and a binder, as necessary. In particular, in the present invention, the anode active material layer contains a solid electrolyte material and the solid electrolyte material is preferably the above-described sulfide solid electrolyte material. The ratio of the sulfide solid electrolyte material contained in the anode active material layer varies depending on the type of the battery. However, the ratio of the sulfide solid electrolyte material is, for example, in the range of 0.1% by volume to 80% by volume, above all, preferably in the range of 1% by volume to 60% by volume and particularly preferably in the range of 10% by volume to 50% by volume. Further, examples of the anode active material may comprise a metal active material and a carbon active material. Examples of the metal active material may include In, Al, Si, and Sn. Meanwhile, examples of the carbon active material may include mesocarbon microbeads (MCMB), high orientation property graphite (HOPG), hard carbon, and soft carbon.

Incidentally, the conductive material and the binder used in the anode active material layer are the same as in the cathode active material layer described above. Further, the thickness of the anode active material layer is, for example, preferably in the range of 0.1 μm to 1000 μm.

3. Electrolyte Layer

The electrolyte layer in the present invention is a layer formed between the cathode active material layer and the anode active material layer. The electrolyte layer is not particularly limited as long as it is a layer in which ion conduction can be performed, but the layer is preferably a solid electrolyte layer composed of a solid electrolyte material. The reason for this is that a battery with high safety can be obtained as compared to the case of a battery using a liquid electrolyte. Further, in the present invention, the solid electrolyte layer preferably contains the above-described sulfide solid electrolyte material. The ratio of the sulfide solid electrolyte material contained in the solid electrolyte layer is preferably, for example, in the range of 10% by volume to 100% by volume, above all, in the range of 50% by volume to 100% by volume. The thickness of the solid electrolyte layer is preferably, for example, in the range of 0.1 μm to 1000 μm, above all, in the range of 0.1 μm to 300 μm. Further, examples of a method for forming a solid electrolyte layer may include a method for compression-molding a solid electrolyte material.

Further, the electrolyte layer in the present invention may be a layer composed of a liquid electrolyte. In the case of using a liquid electrolyte, a higher-output battery can be obtained although safety needs to be further considered as compared to the case of using a solid electrolyte layer. In addition, in this case, generally, at least one of the cathode active material layer and the anode active material layer contains the above-described sulfide solid electrolyte material. The liquid electrolyte generally contains a lithium salt and an organic solvent (a non-aqueous solvent). Examples of the lithium salt may include inorganic lithium salts such as $LiPF_6$, $LiBF_4$, $LiClO_4$, and $LiAsF_6$, and organic lithium salts such as $LiCF_3SO_3$, $LiN(CF_3SO_2)_2$, $LiN(C_2F_5SO_2)_2$, and $LiC(CF_3SO_2)_3$. Examples of the organic solvent may include ethylene carbonate (EC), propylene carbonate (PC), dimethyl carbonate (DMC), diethyl carbonate (DEC), ethylmethyl carbonate (EMC), and butylene carbonate (BC).

4. Other Constitutions

The battery of the present invention has at least the cathode active material layer, the anode active material layer, and the electrolyte layer which are described above. Further, the battery generally has a cathode current collector for collecting current by the cathode active material layer and an anode current collector for collecting current by the anode active material layer. Examples of a material of the cathode current collector may include SUS, aluminum, nickel, iron, titanium, and carbon. On the other hand, examples of a material of the anode current collector may include SUS, copper, nickel, and carbon. Furthermore, the thicknesses and shapes of the cathode current collector and the anode current collector are preferably selected properly according to factors such as the use of the battery. Moreover, a battery case of a general battery can be used for a battery case used for the present invention. Examples of the battery case may include a battery case made of SUS.

5. Battery

The battery of the present invention may be a primary battery or a secondary battery. In particular, a secondary battery is preferable since the secondary battery can be repeatedly charged and discharged and is useful as, for example, a battery mounted on a vehicle. Examples of the shape of the battery of the present invention may include a coin shape, a laminate shape, a barrel shape, and a square shape. Further, a method for producing a battery of the present invention is not particularly limited as long as it is a method by which the above-described battery can be obtained, but the same method as a method for producing a general battery can be used. For example, in a case where the battery of the present invention is an all solid state battery, examples of the producing method may include a method in which a material composed of a cathode active material layer, a material composed of a solid electrolyte layer, and a material composed of an anode active material layer are sequentially pressed to thereby produce a power generating element, this power generating element is accommodated inside a battery case, and the battery case is crimped.

C. Method for Producing Sulfide Solid Electrolyte Material

Next, a method for producing a sulfide solid electrolyte material of the present invention will be described. The method for producing a sulfide solid electrolyte material of the present invention is a method for producing the above-described sulfide solid electrolyte material and the method comprises steps of: an ion conductive material synthesizing step of synthesizing an amorphized ion conductive material by mechanical milling while using a raw material composition containing the constitutional component of the sulfide solid electrolyte material, and a heating step of heating the amorphized ion conductive material to obtain the sulfide solid electrolyte material.

Figure 4:
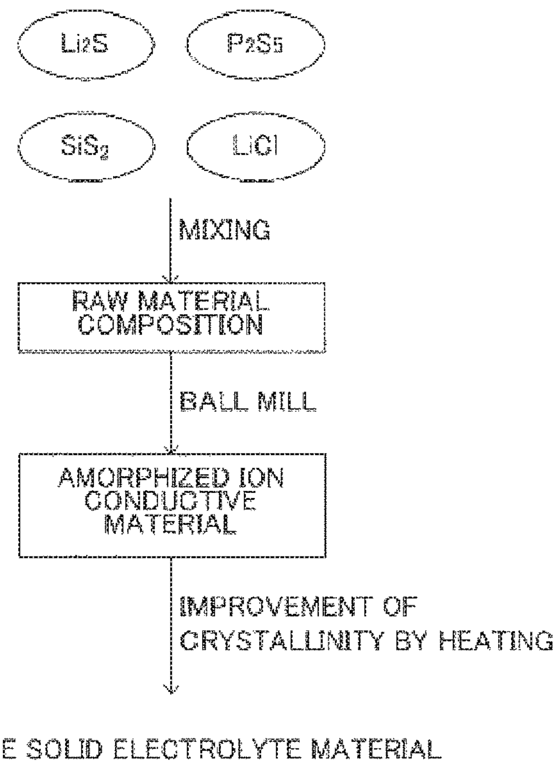
FIG. 4 is an explanatory diagram illustrating an example of a method for producing a sulfide solid electrolyte material of the present invention.

FIG. 4 is an explanatory diagram illustrating an example of a method for producing a sulfide solid electrolyte material of the present invention. In the method for producing a sulfide solid electrolyte material in FIG. 4, first, $Li_2S$, LiCl, $P_2S_5$, and $SiS_2$ are mixed to prepare a raw material composition. At this time, in order to prevent the raw material composition from deteriorating due to moisture in air, it is preferable to prepare a raw material composition under an inert gas atmosphere. Next, ball mill is performed for the raw material composition to obtain an amorphized ion conductive material. Subsequently, the amorphized ion conductive material is heated for improving the crystallinity to thereby obtain a sulfide solid electrolyte material.

According to the present invention, when amorphization is performed in the ion conductive material synthesizing step and then the heating step is performed, it is possible to obtain the sulfide solid electrolyte material with favorable ion conductivity.

Hereinafter, the method for producing a sulfide solid electrolyte material of the present invention will be described in each step.

1. Ion Conductive Material Synthesizing Step

The ion conductive material synthesizing step in the present invention is a step of synthesizing an amorphized ion conductive material by mechanical milling while using a raw material composition containing the constitutional component of the sulfide solid electrolyte material.

The raw material composition in the present invention contains at least a Li element, a Si element, a P element, a S element, and an X element (X is at least one of F, Cl, Br, and I). Further, the raw material composition may contain elements other than the above-described elements. Examples of a compound containing the Li element may include a sulfide of Li. Specific example of the sulfide of Li may include $Li_2S$.

Examples of a compound containing the Si element may include a simple substance of Si and a sulfide of Si. Specific examples of the sulfide of Si may include $SiS_2$. Further, examples of a compound containing the P element may include a simple substance of P and a sulfide of P. Specific examples of the sulfide of P may include $P_2S_5$. Examples of a compound containing the X element may include LiX and $LiPX_4$. Further, regarding other elements used for the raw material composition, a simple substance and sulfide thereof can be used.

The mechanical milling is a method for grinding a test sample while mechanical energy is applied thereto. In the present invention, an amorphized ion conductive material is synthesized by applying mechanical energy to the raw material composition. Examples of such mechanical milling may include vibrating mill, ball mill, turbo mill, mechanofusion, and disk mill; among them, vibrating mill and ball mill are preferable.

The conditions of vibrating mill are not particularly limited as long as an amorphized ion conductive material can be obtained. The vibration amplitude of vibrating mill is preferably, for example, in the range of 5 mm to 15 mm, above all, in the range of 6 mm to 10 mm. The vibration frequency of vibrating mill is preferably, for example, in the range of 500 rpm to 2000 rpm, above all, in the range of 1000 rpm to 1800 rpm. The filling factor of a test sample of vibrating mill is preferably, for example, in the range of 1% by volume to 80% by volume, above all, in the range of 5% by volume to 60% by volume, particularly, in the range of 10% by volume to 50% by volume. Further, a vibrator (for example, a vibrator made of alumina) is preferably used for vibrating mill.

The conditions of ball mill are not particularly limited as long as an amorphized ion conductive material can be obtained. In general, larger number of revolutions brings higher production rate of the ion conductive material, and longer treating time brings higher conversion ratio of the raw material composition into the ion conductive material. The number of weighing table revolutions at the time of performing planetary ball mill is preferably, for example, in the range of 200 rpm to 500 rpm, above all, in the range of 250 rpm to 400 rpm. Further, the treating time at the time of performing planetary ball mill is preferably, for example, in the range of 1 hour to 100 hours, above all, in the range of 1 hour to 70 hours.

2. Heating Step

The heating step in the present invention is a step of heating the amorphized ion conductive material to obtain the sulfide solid electrolyte material.

The heating temperature in the present invention is not particularly limited as long as it is a temperature at which a desired sulfide solid electrolyte material can be obtained, but for example, the heating temperature is preferably 300° C. or higher, more preferably 350° C. or higher, further preferably 400° C. or higher, and particularly preferably 450° C. or higher. On the other hand, the heating temperature is, for example, preferably 1000° C. or lower, more preferably 700° C. or lower, further preferably 650° C. or lower, and particularly preferably 600° C. or lower. Further, the heating time is preferably adjusted properly so as to obtain a desired sulfide solid electrolyte material. In addition, heating in the present invention is preferably performed under an inert gas atmosphere or in a vacuum from the viewpoint of preventing oxidation. Further, the sulfide solid electrolyte material obtained by the present invention is the same as the contents described in the above-described "A. Sulfide Solid Electrolyte Material" and thus the description thereof is omitted.

Incidentally, the present invention is not limited to the embodiments described above. The above embodiments are merely an exemplification and any of those having substantially the same constitution as the technical spirit described in Claims of the present invention and exhibiting the same working effects as those is included in the technical scope of the present invention.

EXAMPLES

Hereinafter, the present invention will be described in more detail by means of Examples.

Example 1

Lithium sulfide ($Li_2S$, manufactured by Nippon Chemical Industrial CO., LTD.), lithium chloride (LiCl, manufactured by Kojundo Chemical Laboratory Co., Ltd.), phosphorus dipentasulfide ($P_2S_5$, manufactured by Aldrich), and silicon sulfide ($SiS_2$, manufactured by JAPAN PURE CHEMICAL CO., LTD.) were used as starting materials. Powders thereof were mixed in a glove box under an argon atmosphere at a ratio presented in the following Table 1 to obtain a raw material composition. Next, 1 g of the raw material composition was put in a pot made of zirconia (45 ml) together with zirconia ball (10 mmϕ, 10 pieces) to hermetically seal the pot completely (an argon atmosphere). This pot was mounted on a planetary ball milling machine (P7™ manufactured by FRITSCH JAPAN CO., LTD.) to perform mechanical milling for 40 hours at the number of weighing table revolutions of 370 rpm. Thus, an amorphized ion conductive material was obtained.

Next, powder of the obtained ion conductive material was put in a carbon-coated quartz tube and the quartz tube was vacuum-sealed. The pressure of the quartz tube for vacuum-sealing was approximately 30 Pa. Next, the quartz tube was placed in a burning furnace, heated from room temperature to 475° C. over 6 hours, maintained at 475° C. for 8 hours, and thereafter slowly cooled up to room temperature. Thus, a sulfide solid electrolyte material including a composition of $Li_{0.3}Si_{0.076}P_{0.05}S_{0.45}Cl_{0.3}$ was obtained.

Examples 2 to 54 and Comparative Examples 1 to 7

A sulfide solid electrolyte material was obtained in the same manner as in Example 1, except that the ratio of the raw material composition was changed to the ratio presented in each of the following Table 1 and Table 2.

Examples 55 to 58

A sulfide solid electrolyte material was obtained in the same manner as in Example 1, except that lithium bromide (LiBr, manufactured by Kojundo Chemical Laboratory Co., Ltd.) was used instead of lithium chloride and the ratio of the raw material composition was changed to the ratio presented in the following Table 3.

[Evaluation]

(X-Ray Diffraction Measurement)

Figure 5A:
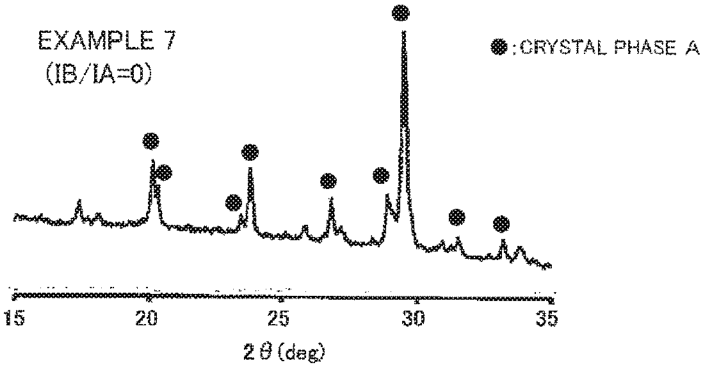
FIGS. 5A to 5C show an X-ray diffraction spectrum of the sulfide solid electrolyte material obtained in each of Examples 7 and 41 and Comparative Example 4.
Figure 5B:
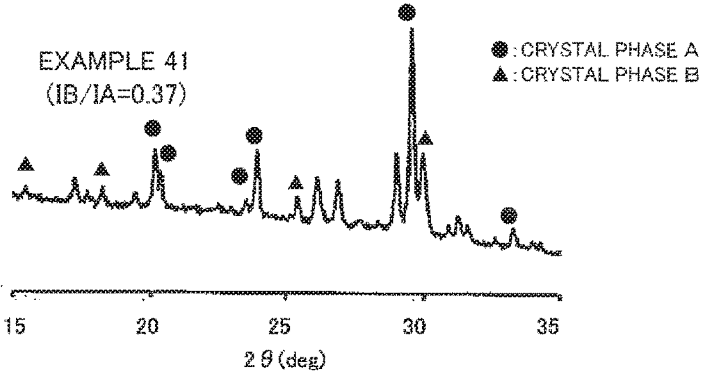
Figure 5C:
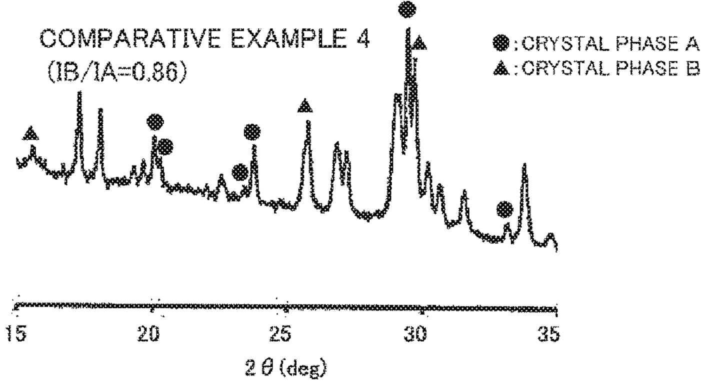
Figure 6A:
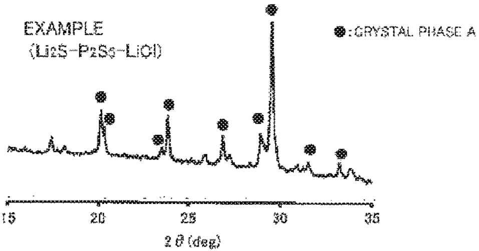
FIGS. 6A and 6B show an X-ray diffraction spectrum of the sulfide solid electrolyte material obtained in each of Examples 7 and 55.
Figure 6B:
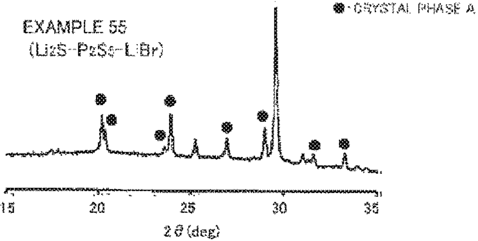

X-ray diffraction (XRD) measurement was performed using the sulfide solid electrolyte material obtained in each of Examples 1 to 58 and Comparative Examples 1 to 7. The XRD measurement was performed for a powder sample under an inert atmosphere on the condition of using a CuKα ray. The representative results are shown in FIGS. 5A to 5C and FIGS. 6A and 6B. As shown in FIG. 5A, in Example 7, a peak of the crystal phase A was determined and a peak of the crystal phase B was not determined. On the other hand, as shown in FIGS. 5B and 5C, in Example 41 and Comparative Example 4, peaks of the crystal phase A and the crystal phase B were determined, and the ratio of the crystal phase B in Comparative Example 4 was larger than that in Example 41. Further, as shown in FIGS. 6A and 6B, in Example 7 and Example 55, a peak of the crystal phase A was determined and a peak of the crystal phase B was not determined. In Example 7 and Example 55, the same peak was obtained although the type of halogen is different. Further, $I_B/I_A$ was obtained from the result of the XRD measurement. The results thus obtained are presented in Table 1 to Table 3.

(Li Ion Conductance Measurement)

The Li ion conductance at 25° C. was measured using the sulfide solid electrolyte material obtained in each of Examples 1 to 58 and Comparative Examples 1 to 7. First, 200 mg of the sulfide solid electrolyte material was weighed, put in a cylinder made of MACOR, and pressed at a pressure of 4 ton/cm$^2$. The both ends of the obtained pellet were pinched with a pin made of SUS, and the confining pressure was applied to the pellet by fastening bolts, thereby obtaining a cell for evaluation. The Li ion conductance was calculated according to an alternating-current impedance method while the cell for evaluation was maintained at 25° C. The measurement was performed using Solartron 1260™ at an applied voltage of 5 mV and a measurement frequency range of 0.01 to 1 MHz. The results thus obtained are presented in Table 1 to Table 3 and FIG. 7.

TABLE 1

| | Li2S (g) | LiCl (g) | P2S5 (g) | SiS2 (g) | x | y | z | w | $I_B/I_A$ | CONDUCTANCE (S/cm) |
|---|---|---|---|---|---|---|---|---|---|---|
| EXAMPLE 1 | 0.3793 | 0.04861 | 0.2849 | 0.3172 | 0.3889 | 0.0758 | 0.0505 | 0.0253 | 0.60 | 0.00270 |
| EXAMPLE 2 | 0.3660 | 0.04966 | 0.2603 | 0.3240 | 0.3802 | 0.0781 | 0.0521 | 0.0280 | 0.07 | 0.00889 |
| EXAMPLE 3 | 0.4172 | 0.02333 | 0.3058 | 0.2537 | 0.4048 | 0.0595 | 0.0595 | 0.0119 | 0.23 | 0.00516 |
| EXAMPLE 4 | 0.4048 | 0.02383 | 0.3123 | 0.2591 | 0.3968 | 0.0613 | 0.0013 | 0.0123 | 0.14 | 0.00568 |
| EXAMPLE 5 | 0.3918 | 0.02434 | 0.3191 | 0.2648 | 0.3884 | 0.0633 | 0.0633 | 0.0127 | 0.09 | 0.00649 |
| EXAMPLE 6 | 0.3851 | 0.02461 | 0.3226 | 0.2677 | 0.3839 | 0.0643 | 0.0643 | 0.0129 | 0.06 | 0.00658 |
| EXAMPLE 7 | 0.3783 | 0.02489 | 0.3262 | 0.2707 | 0.3794 | 0.0653 | 0.0653 | 0.0131 | 0 | 0.00659 |
| EXAMPLE 8 | 0.3927 | 0.04675 | 0.3064 | 0.2542 | 0.3976 | 0.0602 | 0.0602 | 0.0241 | 0.25 | 0.00892 |
| EXAMPLE 9 | 0.3805 | 0.04768 | 0.3125 | 0.2593 | 0.3898 | 0.0620 | 0.0620 | 0.0248 | 0.08 | 0.00698 |
| EXAMPLE 10 | 0.3678 | 0.04866 | 0.3189 | 0.2646 | 0.3816 | 0.0638 | 0.0638 | 0.0255 | 0.06 | 0.00513 |
| EXAMPLE 11 | 0.3867 | 0.04604 | 0.3168 | 0.2504 | 0.3934 | 0.0596 | 0.0626 | 0.0238 | 0.16 | 0.00866 |
| EXAMPLE 12 | 0.3810 | 0.04536 | 0.3270 | 0.2467 | 0.3894 | 0.0590 | 0.0649 | 0.0236 | 0.14 | 0.00513 |
| EXAMPLE 13 | 0.3877 | 0.04616 | 0.3025 | 0.2636 | 0.3940 | 0.0627 | 0.0597 | 0.0239 | 0.25 | 0.00859 |
| EXAMPLE 14 | 0.3829 | 0.04559 | 0.2988 | 0.2727 | 0.3905 | 0.0651 | 0.0592 | 0.0237 | 0.14 | 0.00984 |
| EXAMPLE 15 | 0.3782 | 0.04503 | 0.2951 | 0.2816 | 0.3871 | 0.0674 | 0.0587 | 0.0235 | 0.10 | 0.00740 |
| EXAMPLE 16 | 0.3737 | 0.04449 | 0.2916 | 0.2903 | 0.3837 | 0.0698 | 0.0581 | 0.0233 | 0.00 | 0.00716 |
| EXAMPLE 17 | 0.3680 | 0.07026 | 0.3070 | 0.2547 | 0.3902 | 0.0610 | 0.0610 | 0.0366 | 0.62 | 0.00614 |
| EXAMPLE 18 | 0.3562 | 0.07158 | 0.3127 | 0.2595 | 0.3827 | 0.0626 | 0.0626 | 0.0376 | 0.09 | 0.00647 |
| EXAMPLE 19 | 0.3439 | 0.07294 | 0.3187 | 0.2644 | 0.3748 | 0.0644 | 0.0644 | 0.0386 | 0.22 | 0.00387 |
| EXAMPLE 20 | 0.4049 | 0.03503 | 0.3061 | 0.2540 | 0.4012 | 0.0599 | 0.0599 | 0.0180 | 0.27 | 0.00655 |
| EXAMPLE 21 | 0.3985 | 0.04670 | 0.2754 | 0.2793 | 0.4012 | 0.0659 | 0.0539 | 0.0240 | 0.60 | 0.00424 |
| EXAMPLE 22 | 0.3863 | 0.04765 | 0.2810 | 0.2850 | 0.3935 | 0.0678 | 0.0555 | 0.0246 | 0.22 | 0.00874 |
| EXAMPLE 23 | 0.3736 | 0.04863 | 0.2869 | 0.2909 | 0.3853 | 0.0698 | 0.0571 | 0.0254 | 0.07 | 0.00839 |
| EXAMPLE 24 | 0.3740 | 0.07018 | 0.2760 | 0.2799 | 0.3939 | 0.0667 | 0.0545 | 0.0364 | 0.29 | 0.00458 |
| EXAMPLE 25 | 0.4113 | 0.02335 | 0.3367 | 0.2286 | 0.4012 | 0.0539 | 0.0659 | 0.0120 | 0.22 | 0.00530 |
| EXAMPLE 26 | 0.3868 | 0.04680 | 0.3374 | 0.2291 | 0.3939 | 0.0545 | 0.0667 | 0.0242 | 0.23 | 0.00702 |
| EXAMPLE 27 | 0.3990 | 0.03507 | 0.3371 | 0.2288 | 0.3976 | 0.0542 | 0.0663 | 0.0181 | 0.19 | 0.00595 |
| EXAMPLE 28 | 0.4210 | 0 | 0.2901 | 0.2889 | 0.3982 | 0.0681 | 0.0567 | 0 | 0.07 | 0.00394 |
| EXAMPLE 29 | 0.4100 | 0.02381 | 0.2837 | 0.2825 | 0.4000 | 0.0666 | 0.0555 | 0.0122 | 0.35 | 0.00480 |
| EXAMPLE 30 | 0.3970 | 0.02433 | 0.2899 | 0.2887 | 0.3916 | 0.0887 | 0.0572 | 0.0126 | 0.11 | 0.00866 |

TABLE 2

| | Li2S (g) | LiCl (g) | P2S5 (g) | SiS2 (g) | x | y | z | w | $I_B/I_A$ | CONDUCTANCE (S/cm) |
|---|---|---|---|---|---|---|---|---|---|---|
| EXAMPLE 31 | 0.3834 | 0.02488 | 0.2965 | 0.2952 | 0.3827 | 0.0709 | 0.0591 | 0.0130 | 0 | 0.00652 |
| EXAMPLE 32 | 0.3979 | 0.03572 | 0.2838 | 0.2826 | 0.3966 | 0.0699 | 0.0558 | 0.0184 | 0.27 | 0.00521 |
| EXAMPLE 33 | 0.3850 | 0.03649 | 0.2898 | 0.2886 | 0.3883 | 0.0690 | 0.0575 | 0.0190 | 0.09 | 0.00707 |
| EXAMPLE 34 | 0.3716 | 0.03729 | 0.2962 | 0.2949 | 0.3795 | 0.0712 | 0.0593 | 0.0196 | 0.05 | 0.00598 |
| EXAMPLE 35 | 0.3857 | 0.05843 | 0.2785 | 0.2773 | 0.3973 | 0.0658 | 0.0548 | 0.0301 | 0.58 | 0.00710 |
| EXAMPLE 36 | 0.3737 | 0.05958 | 0.2840 | 0.2828 | 0.3896 | 0.0676 | 0.0563 | 0.0310 | 0.16 | 0.00662 |
| EXAMPLE 37 | 0.3611 | 0.06078 | 0.2897 | 0.2885 | 0.3816 | 0.0696 | 0.0580 | 0.0319 | 0.12 | 0.00571 |
| EXAMPLE 38 | 0.3480 | 0.06202 | 0.2956 | 0.2944 | 0.3730 | 0.0717 | 0.0597 | 0.0329 | 0.10 | 0.00453 |
| EXAMPLE 39 | 0.3902 | 0.04331 | 0.2838 | 0.2827 | 0.3944 | 0.0671 | 0.0559 | 0.0224 | 0.22 | 0.00643 |
| EXAMPLE 40 | 0.3839 | 0.04376 | 0.2868 | 0.2856 | 0.3904 | 0.0681 | 0.0568 | 0.0227 | 0.17 | 0.00893 |
| EXAMPLE 41 | 0.4195 | 0.01330 | 0.2720 | 0.2951 | 0.4022 | 0.0693 | 0.0530 | 0.0068 | 0.37 | 0.00303 |
| EXAMPLE 42 | 0.3857 | 0.02666 | 0.3005 | 0.2871 | 0.3850 | 0.0688 | 0.0598 | 0.0139 | 0 | 0.00878 |
| EXAMPLE 43 | 0.3518 | 0.04007 | 0.3292 | 0.2789 | 0.3670 | 0.0683 | 0.0669 | 0.0213 | 0.42 | 0.00235 |
| EXAMPLE 44 | 0.3688 | 0.03336 | 0.3148 | 0.2830 | 0.3761 | 0.0685 | 0.0633 | 0.0176 | 0 | 0.00812 |
| EXAMPLE 45 | 0.4090 | 0.01333 | 0.3276 | 0.2501 | 0.3957 | 0.0592 | 0.0644 | 0.0069 | 0.11 | 0.00542 |
| EXAMPLE 46 | 0.3763 | 0.02671 | 0.3501 | 0.2469 | 0.3789 | 0.0598 | 0.0702 | 0.0140 | 0.18 | 0.00533 |
| EXAMPLE 47 | 0.3905 | 0.02664 | 0.2758 | 0.3071 | 0.3880 | 0.0733 | 0.0546 | 0.0138 | 0.11 | 0.00447 |
| EXAMPLE 48 | 0.3560 | 0.04004 | 0.3075 | 0.2965 | 0.3697 | 0.0723 | 0.0622 | 0.0212 | 0 | 0.00545 |
| EXAMPLE 49 | 0.4143 | 0.01332 | 0.2988 | 0.2726 | 0.3990 | 0.0643 | 0.0587 | 0.0068 | 0.17 | 0.00512 |
| EXAMPLE 50 | 0.3810 | 0.02668 | 0.3253 | 0.2670 | 0.3820 | 0.0642 | 0.0649 | 0.0140 | 0 | 0.00640 |
| EXAMPLE 51 | 0.3977 | 0.01999 | 0.3125 | 0.2698 | 0.3906 | 0.0643 | 0.0618 | 0.0104 | 0.10 | 0.00630 |
| EXAMPLE 52 | 0.3644 | 0.03339 | 0.3381 | 0.2642 | 0.3732 | 0.0642 | 0.0682 | 0.0177 | 0.30 | 0.00342 |
| EXAMPLE 53 | 0.3919 | 0.05740 | 0.3010 | 0.2497 | 0.4012 | 0.0590 | 0.0590 | 0.0295 | 0.10 | 0.00755 |
| EXAMPLE 54 | 0.3632 | 0.09654 | 0.2953 | 0.2450 | 0.3972 | 0.0583 | 0.0583 | 0.0500 | 0.35 | 0.00803 |
| COMPARATIVE EXAMPLE 1 | 0.3562 | 0.07042 | 0.3692 | 0.2042 | 0.3827 | 0.0494 | 0.0741 | 0.0370 | 0.99 | 0.00179 |
| COMPARATIVE EXAMPLE 2 | 0.3716 | 0.04965 | 0.2278 | 0.3510 | 0.3838 | 0.0842 | 0.0453 | 0.0259 | 3.15 | 0.00034 |

TABLE 2-continued

| | Li2S (g) | LiCl (g) | P2S5 (g) | SiS2 (g) | x | y | z | w | $I_B/I_A$ | CONDUCTANCE (S/cm) |
|---|---|---|---|---|---|---|---|---|---|---|
| COMPARATIVE EXAMPLE 3 | 0.3576 | 0.05076 | 0.2329 | 0.3588 | 0.3746 | 0.0870 | 0.0468 | 0.0268 | 0.72 | 0.00165 |
| COMPARATIVE EXAMPLE 4 | 0.3621 | 0.07034 | 0.3381 | 0.2295 | 0.3865 | 0.0552 | 0.0675 | 0.0368 | 0.86 | 0.00171 |
| COMPARATIVE EXAMPLE 5 | 0.4071 | 0 | 0.2970 | 0.2958 | 0.3890 | 0.0704 | 0.0587 | 0 | 6.92 | 0.00049 |
| COMPARATIVE EXAMPLE 6 | 0.3765 | 0.09453 | 0.2891 | 0.2399 | 0.4052 | 0.0566 | 0.0566 | 0.0485 | 0.60 | 0.00105 |
| COMPARATIVE EXAMPLE 7 | 0.4299 | 0 | 0.3670 | 0.2030 | 0.4048 | 0.0476 | 0.0714 | 0 | 0 | 0.00200 |

TABLE 3

| | Li2S (g) | LiBr (g) | P2S5 (g) | SiS2 (g) | x | y | z | w | $I_B/I_A$ | CONDUCTANCE (S/cm) |
|---|---|---|---|---|---|---|---|---|---|---|
| EXAMPLE 55 | 0.3607 | 0.08657 | 0.2770 | 0.2758 | 0.3862 | 0.0692 | 0.0576 | 0.0231 | 0 | 0.00865 |
| EXAMPLE 56 | 0.3871 | 0.04861 | 0.2827 | 0.2815 | 0.3916 | 0.0687 | 0.0572 | 0.0126 | 0 | 0.00611 |
| EXAMPLE 57 | 0.3797 | 0.04966 | 0.2542 | 0.3164 | 0.3866 | 0.0776 | 0.0517 | 0.0129 | 0 | 0.00829 |
| EXAMPLE 58 | 0.3609 | 0.09475 | 0.2425 | 0.3018 | 0.3889 | 0.0758 | 0.0505 | 0.0253 | 0 | 0.00702 |

Figure 7:
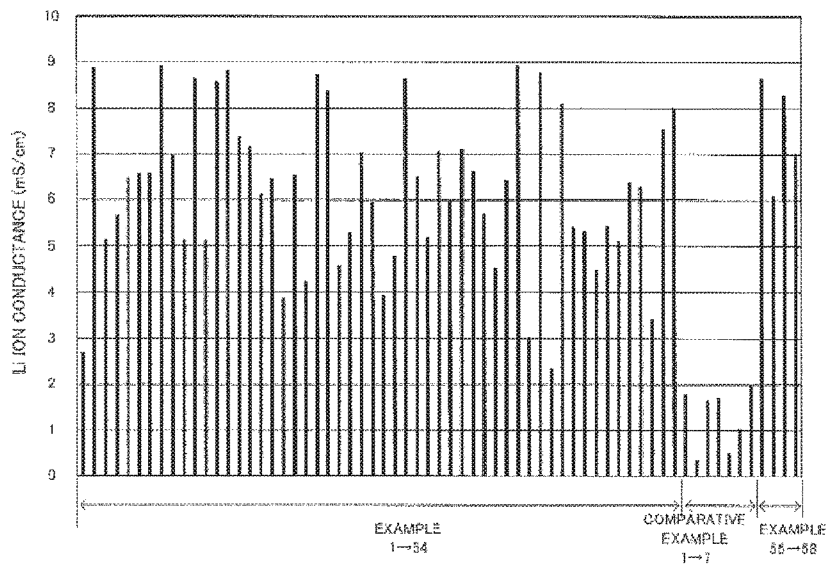
FIG. 7 shows Li ion conductance of the sulfide solid electrolyte material obtained in each of Examples 1 to 58 and Comparative Examples 1 to 7.
Figure 8:
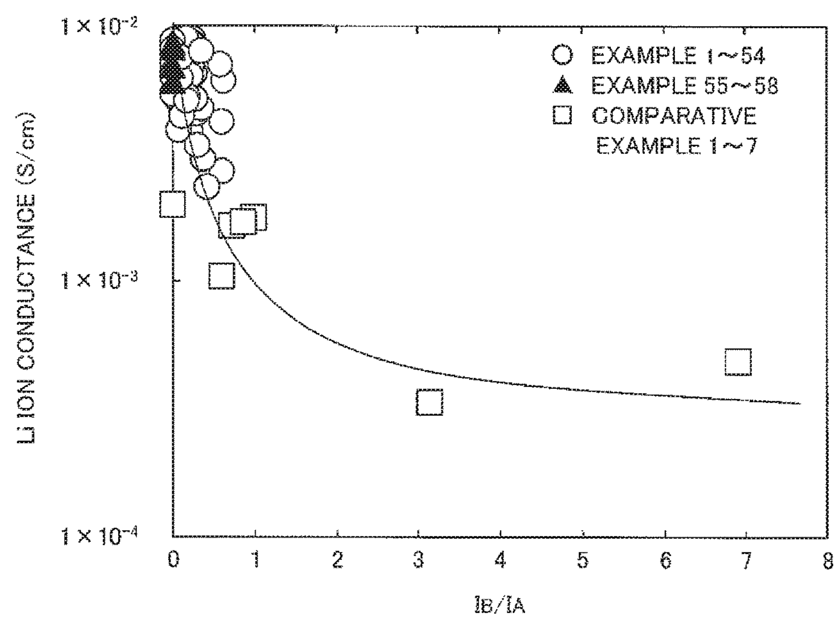
FIG. 8 is a graph showing a relation between $I_B/I_A$ and ion conductance in the sulfide solid electrolyte material obtained in each of Examples 1 to 58 and Comparative Examples 1 to 7.

As shown in Table 1 to Table 3 and FIG. 7, the Li ion conductance in Examples 1 to 58 was higher than that in Comparative Examples 1 to 7. In particular, in Comparative Examples 6 and 7, although $I_B/I_A \leq 0.6$ was satisfied, the compositional range deviated and thus the Li ion conductance became lower. Meanwhile, the relation between $I_B/I_A$ and Li ion conductance is shown in FIG. 8. As shown in FIG. 8, it was confirmed that in the compositional range of the present invention, as the value of $I_B/I_A$ decreases, the Li ion conductance is improved.

REFERENCE SIGNS LIST

1 Cathode active material layer
2 Anode active material layer
3 Electrolyte layer
4 Cathode current collector
5 Anode current collector
6 Battery case
10 Battery

What is claimed is:

1. A sulfide solid electrolyte material comprising a composition of:

$$Li_xSi_yP_zS_{1-x-y-z-w}Cl_w$$

where:
$0.3697 \leq x \leq 0.4048$,
$0.0539 \leq y \leq 0.0781$,
$0.0521 \leq z \leq 0.0702$, and
$0 \leq w \leq 0.05$,
wherein:
the sulfide solid electrolyte material has a crystal phase A having a peak at a position of $2\theta=20.18°\pm1.00°$ and $29.58°\pm1.00°$ in X-ray diffraction measurement using a CuKα ray, and
the sulfide solid electrolyte material does not have a crystal phase B having a peak at a position of $2\theta=15.60°\pm1.00°$ and $30.12°\pm1.00°$ in X-ray diffraction measurement using a CuKα ray, or
in a case where the sulfide solid electrolyte material has the crystal phase B, when a diffraction intensity at the peak of $2\theta=29.58°\pm1.00°$ is designated as $I_A$ and a diffraction intensity at the peak of $2\theta=30.12°\pm1.00°$ is designated as $I_B$, a value of $I_B/I_A$ is 0.6 or less.

2. A battery comprising:
a cathode active material layer containing a cathode active material;
an anode active material layer containing an anode active material; and
an electrolyte layer formed between the cathode active material layer and the anode active material layer,
wherein at least one of the cathode active material layer, the anode active material layer, and the electrolyte layer comprises the sulfide solid electrolyte material according to claim 1.

3. The sulfide solid electrolyte material according to claim 1, wherein:
$0.3802 \leq x \leq 0.4012$,
$0.054 \leq y \leq 0.078$,
$0.0521 \leq z \leq 0.0667$, and
$0.0126 \leq w \leq 0.05$.

4. A sulfide solid electrolyte material comprising a composition of $$Li_xSi_yP_zS_{1-x-y-z-w}Br_w,$$

where:
$0.3862 \leq x \leq 0.3916$,
$0.0687 \leq y \leq 0.0776$,
$0.0505 \leq z \leq 0.0576$, and
$0.0126 \leq w \leq 0.0253$,
wherein
the sulfide solid electrolyte material has a crystal phase A having a peak at a position of $2\theta=20.18°\pm1.00°$ and $29.58°\pm1.00°$ in X-ray diffraction measurement using a CuKα ray, and
the sulfide solid electrolyte material does not have a crystal phase B having a peak at a position of $2\theta=15.60°\pm1.00°$ and $30.12°\pm1.00°$ in X-ray diffraction measurement using a CuKα ray.

5. A battery comprising:
a cathode active material layer containing a cathode active material;

an anode active material layer containing an anode active material; and an electrolyte layer formed between the cathode active material layer and the anode active material layer, wherein at least one of the cathode active material layer, the anode active material layer, and the electrolyte layer contains the sulfide solid electrolyte material according to claim 4.

6. A method for producing the sulfide solid electrolyte material according to claim 4, the method comprising:

synthesizing an amorphized ion conductive material by mechanical milling while using a raw material composition containing a constitutional component of the sulfide solid electrolyte material; and heating the amorphized ion conductive material to obtain the sulfide solid electrolyte material.

* * * * *